(12) United States Patent
Frederick et al.

(10) Patent No.: US 7,237,828 B2
(45) Date of Patent: Jul. 3, 2007

(54) UNDERBODY CRASH DEVICE FOR A VEHICLE

(75) Inventors: Gregory Frederick, Shelby Township, MI (US); Phillip Przybylo, Williamston, MI (US); Xiaowei Li, Northville, MI (US); Saeed Barbat, Farmington Hills, MI (US); Hikmat Mahmood, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 48 days.

(21) Appl. No.: 11/164,120

(22) Filed: Nov. 10, 2005

(65) Prior Publication Data
US 2007/0102963 A1 May 10, 2007

(51) Int. Cl.
*B60T 7/12* (2006.01)

(52) U.S. Cl. ............... 296/187.03; 296/187.09; 293/6; 188/5; 180/276

(58) Field of Classification Search .......... 293/6; 188/5; 296/187.03, 187.09; 180/276
See application file for complete search history.

(56) References Cited

U.S. PATENT DOCUMENTS

| | | | |
|---|---|---|---|
| 2,873,994 A | 2/1959 | Omps | |
| 3,349,865 A * | 10/1967 | Deutsch | 180/276 |
| 3,677,595 A | 7/1972 | Hamilton | |
| 3,947,061 A | 3/1976 | Ellis | |
| 3,994,369 A * | 11/1976 | Powaska | 188/5 |
| 4,514,002 A | 4/1985 | McIntosh | |
| 4,582,351 A | 4/1986 | Edwards | |
| 4,979,770 A | 12/1990 | Shal-Bar | |
| 5,226,685 A | 7/1993 | Chen | |
| 5,520,428 A | 5/1996 | Bell | |
| 5,624,143 A | 4/1997 | Waldschmitt | |
| 6,142,542 A | 11/2000 | Sherno | |
| 6,158,556 A * | 12/2000 | Swierczewski | 188/5 |
| 6,189,941 B1 | 2/2001 | Nohr | |
| 6,764,118 B2 | 7/2004 | DePottey et al. | |

FOREIGN PATENT DOCUMENTS

EP 000299357 1/1989

* cited by examiner

*Primary Examiner*—Dennis H. Pedder
(74) *Attorney, Agent, or Firm*—Gigette Bejin; Artz & Artz, P.C.

(57) ABSTRACT

An underbody crash device for a vehicle. The underbody crash device comprises a pillar member attached to the vehicle. The vehicle has a primary load path for absorbing crash energy in a collision. The pillar member is movable to a deployed position for supporting the vehicle directly on the ground and positioning the primary load path to increase crash energy absorbed therein.

8 Claims, 4 Drawing Sheets

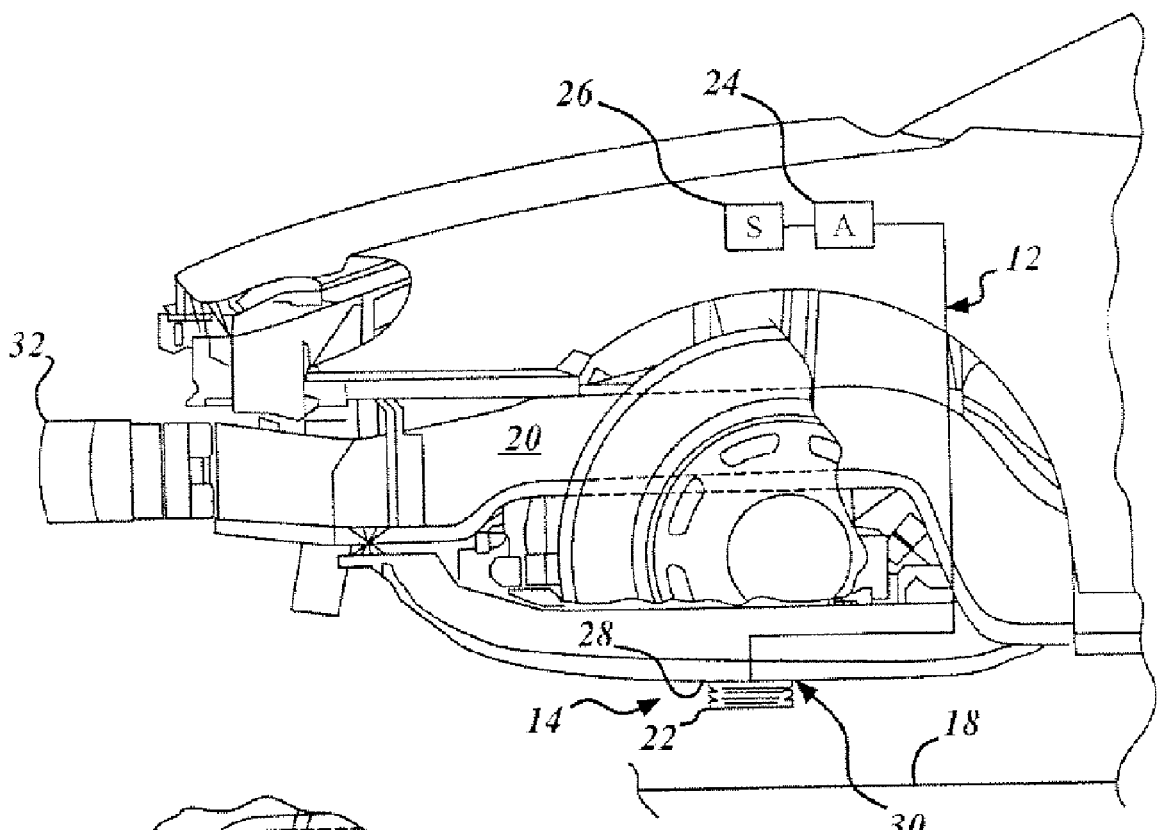
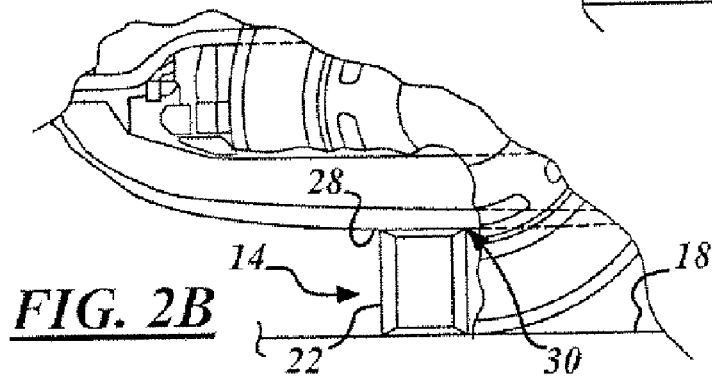
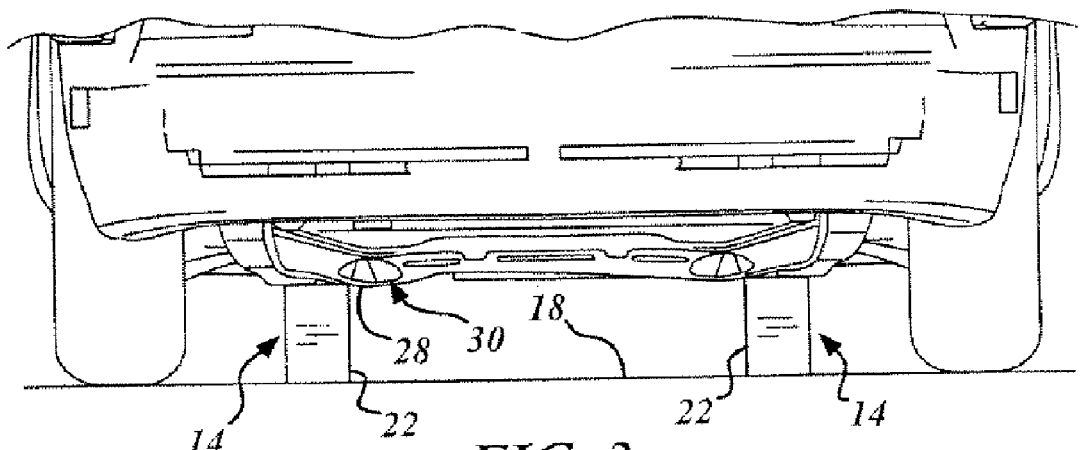

UNDERBODY CRASH DEVICE FOR A VEHICLE

TECHNICAL FIELD

The present invention relates generally to vehicles, and more particularly to improving the management of crash energy in car-to-truck collisions.

BACKGROUND

Automotive manufacturers are investigating devices that prevent a car from riding under a taller-profile truck during a collision. One known device is a movable bumper for a truck. Typically, this bumper can be moved to a lower position on the truck for blocking a shorter-profile car. Also, the bumper typically is located in a forward-most or a rearward-most location on the truck. In this way, the taller and typically heavier truck does not ride over and intrude farther into the car.

It would therefore be desirable to provide an underbody crash device for a short-profile car that prevents the car from submerging under a taller-profile truck.

SUMMARY OF THE INVENTION

An underbody crash device for a vehicle is provided. The underbody crash device comprises a pillar member attached to the vehicle. This vehicle has a primary load path for absorbing crash energy in a collision. The pillar member is movable to a deployed position for supporting the vehicle directly on the ground and sufficiently positioning the vehicle to increase the crash energy absorbed within the primary load path.

One advantage of the invention is that an underbody crash device is provided that improves vehicle safety by preventing a vehicle from submerging under a taller-profile vehicle.

Another advantage of the invention is that an underbody crash device is provided that enhances vehicle safety by increasing the crash energy absorbed within a primary load path for a short-profile car during a car-to-truck collision.

Still another advantage of the invention is that an underbody crash device is provided that is easily installed in a vehicle with minor modifications therein.

Yet another advantage of the invention is that an underbody crash device is provided that includes a supplemental load path and enhances the management of crash energy for the vehicle.

Other advantages of the present invention will become apparent upon considering the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of the examples of the invention:

FIG. 2A is a side view of the car shown in FIG. 1, illustrating the crash device in a stored position.

FIG. 2B is a side view of the crash device shown in FIG. 2A, illustrating the crash device in a deployed position.

FIG. 3 is a front view of the car shown in FIG. 1, illustrating the underbody support system having two underbody crash devices.

DETAILED DESCRIPTION OF THE INVENTION

Figure 1:
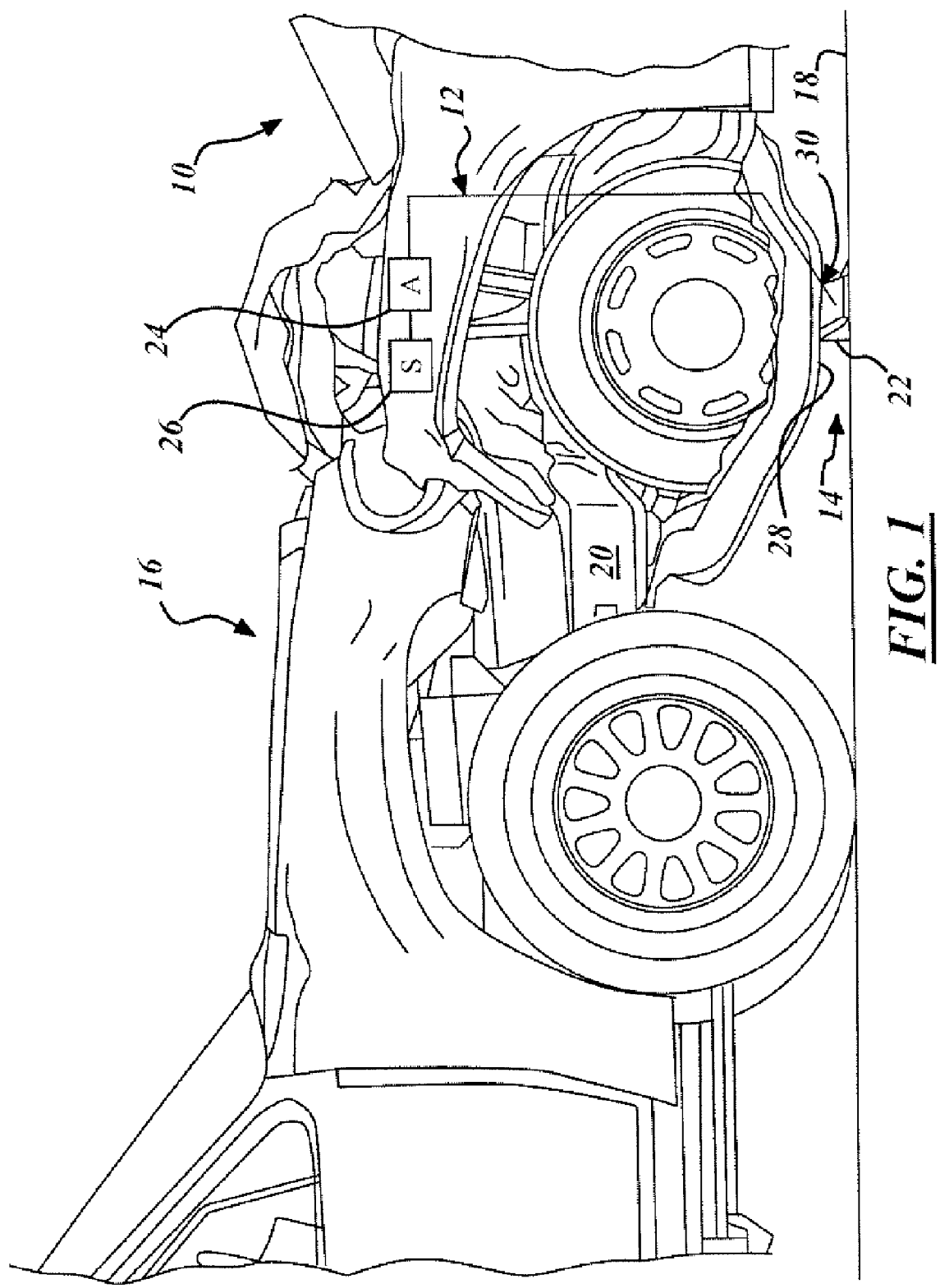
FIG. 1 is a side view of a car having an underbody support system with an underbody crash device, illustrating the device in a deployed position during a car-to-truck collision, according to one advantageous embodiment of the claimed invention.

In the following figures, the same reference numerals are used to identify the same components in the various views.

The present invention is particularly suited for an underbody crash device for a car or other short-profile passenger vehicle in a car-to-truck collision. To that end, the embodiments described herein employ structural features where the context permits. However, various other embodiments are contemplated having different combinations of the described features, having additional features other than those described herein, or even lacking one or more of those features.

Referring to FIG. 1, there is shown a car 10 having an underbody support system 12 with an underbody crash device 14, according to one advantageous embodiment of the invention. This crash device 14 is utilized for preventing the car 10 from submerging underneath a sports utility vehicle 16 or other taller-profile vehicle ("SUV") in a frontal impact.

As detailed in the embodiments described below, the underbody crash device 14 is comprised of one or more pillar members that are movable between a stored position and a deployed position. In the deployed position, the pillar members support the car 10 directly on the ground or other road surface 18 and thus prevent the front end of the car 10 from diving underneath the SUV 16. The pillar members also sufficiently position the car 10 to increase the crash energy absorbed within a primary load path for the car 10. In this embodiment, the primary load path is a deformable sub-frame 20 for the car 10. However, the primary load path can be comprised of other suitable vehicle structures as desired. As also detailed below, each pillar member is moved to the deployed position by an actuator, which is triggered by a crash sensor.

In the embodiment shown in FIGS. 2A and 2B, the pillar member is an expandable metal box 22 and the actuator is pyrotechnic inflator device 24. For instance, the inflator device 24 can include a sodium azide compound typically utilized for a conventional vehicle airbag system. The box 22 has a closed-ended construction comprised of thin sheet metal. Also, the crash sensors are comprised of one or more accelerometers 26. However, it will be appreciated that the crash sensors can be various other suitable sensors as desired.

In the stored position shown in FIG. 2A, the box 22 is folded along its longitudinal axis in an accordion-like fashion. At the beginning of a collision, the accelerometer 26 triggers the inflator device 24 to expand the box 22 to the deployed position (shown in FIG. 2B). In this respect, the deployed box 22 sufficiently supports and positions the sub-frame 20 to deform in a rearward direction and directly absorbs the crash energy during the car-to-truck collision. By way of the example shown in FIG. 1, the box 22 also has a deformable construction for collapsing toward the road surface 18 and providing a supplemental load path to further enhance the management of crash energy.

With attention to FIG. 3, two (2) expandable boxes 22 are attached to an underbody structure for the car 10, preferably beneath the engine cradle. However, more or less than two (2) expandable boxes 22 can be utilized as desired. As shown in FIGS. 2A and 2B, each expandable box 22 or other suitable pillar member has a compact construction that is attached to a bottom portion 28 of an axle casing 30 for the car 10. In this way, the expandable box 22 has efficient packaging and is therefore easily installed within a car 10 without substantial modifications therein. It is contemplated that the expandable box 22 can instead be attached to a cross member, a sub-frame, a rocker, various other structures under the engine cradle, other suitable portions of the car 10, or any combination thereof.

Referring back to FIG. 2, each expandable box 22 is offset rearward from a front bumper 32 for the car 10. Namely, in this embodiment, the expandable boxes 22 are aligned with the front axle for the car 10. In this way, the expandable boxes 22 in the stored position are located beyond the line of sight of individuals approaching the car 10 and thus maintain an aesthetically pleasing appearance. It is understood that the expandable boxes 22 or other suitable pillar member can instead be integrated within a rear-end vehicle structure and offset forward from a rear bumper.

Figure 4A:
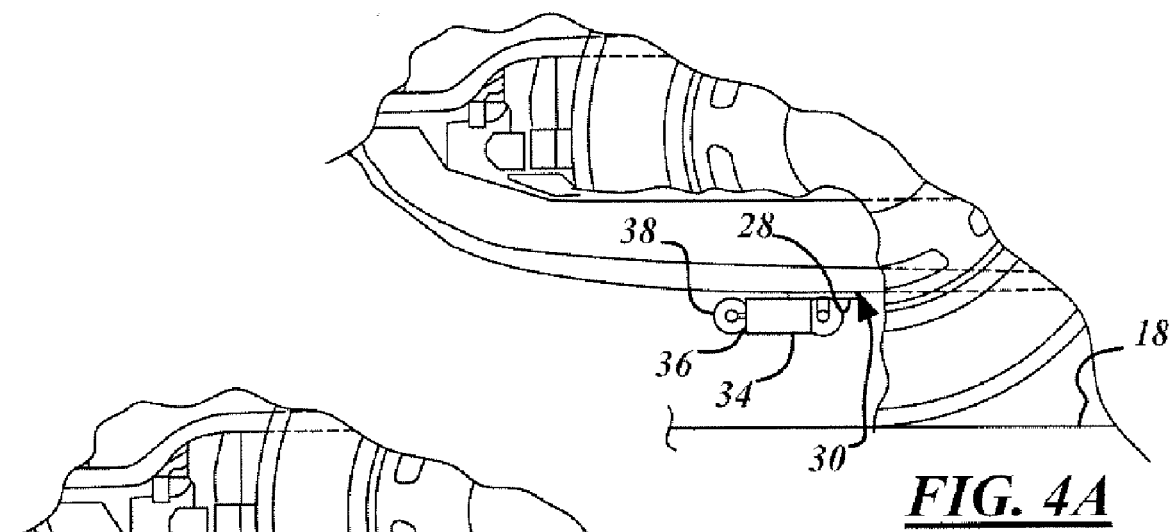
FIGS. 4A and 4B are side views of the crash device shown in FIG. 1, respectively illustrating the crash device in a stored position and a deployed position, according to another advantageous embodiment of the claimed invention.
Figure 4B:
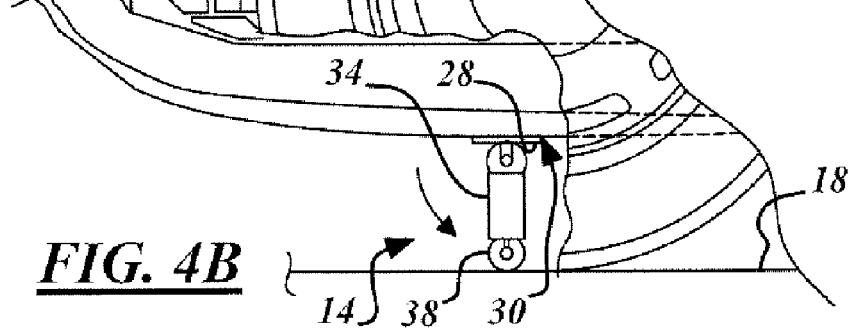

With attention to the embodiment shown FIGS. 4A and 4B, the pillar member is comprised of a rigid support arm 34 having an end portion 36 with a wheel 38 attached thereto. Also, the actuator is a conventional motor (not shown) that moves the support arm 34 from the stored position (shown in FIG. 4A) to the deployed position (shown in FIG. 4B). In this respect, the support arm 34 supports the car 10 in a direction perpendicular to the road surface 18 without buckling or otherwise deforming generally along a direction parallel to the road surface 18. It is understood that the support arm 34 can instead have a deformable construction as desired.

Figure 5A:
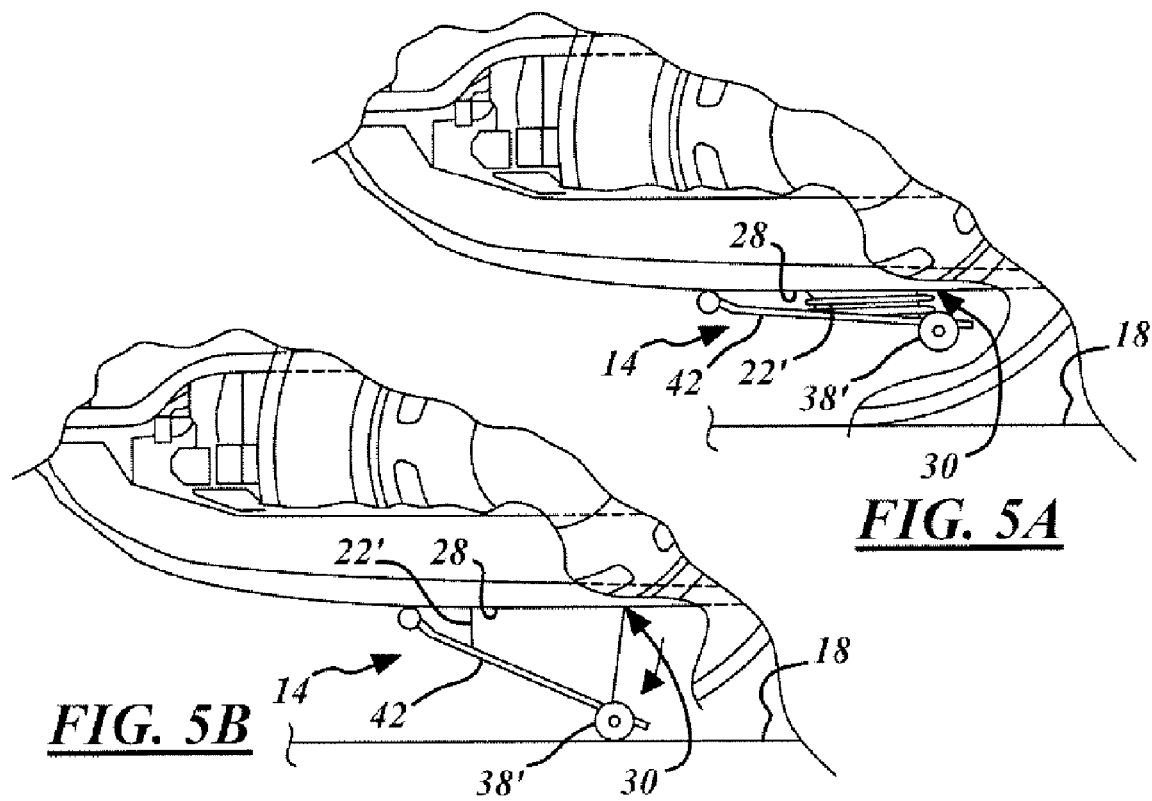
FIGS. 5A and 5B are side views of the crash device shown in FIG. 1, respectively illustrating the crash device in a stored position and a deployed position, according to still another advantageous embodiment of the claimed invention.
Figure 5B:
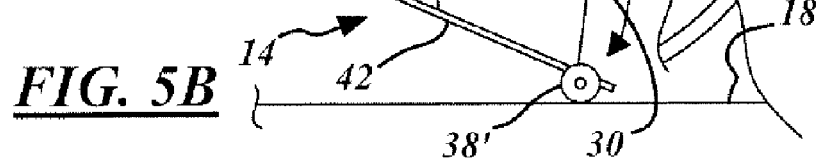
Figure 6:
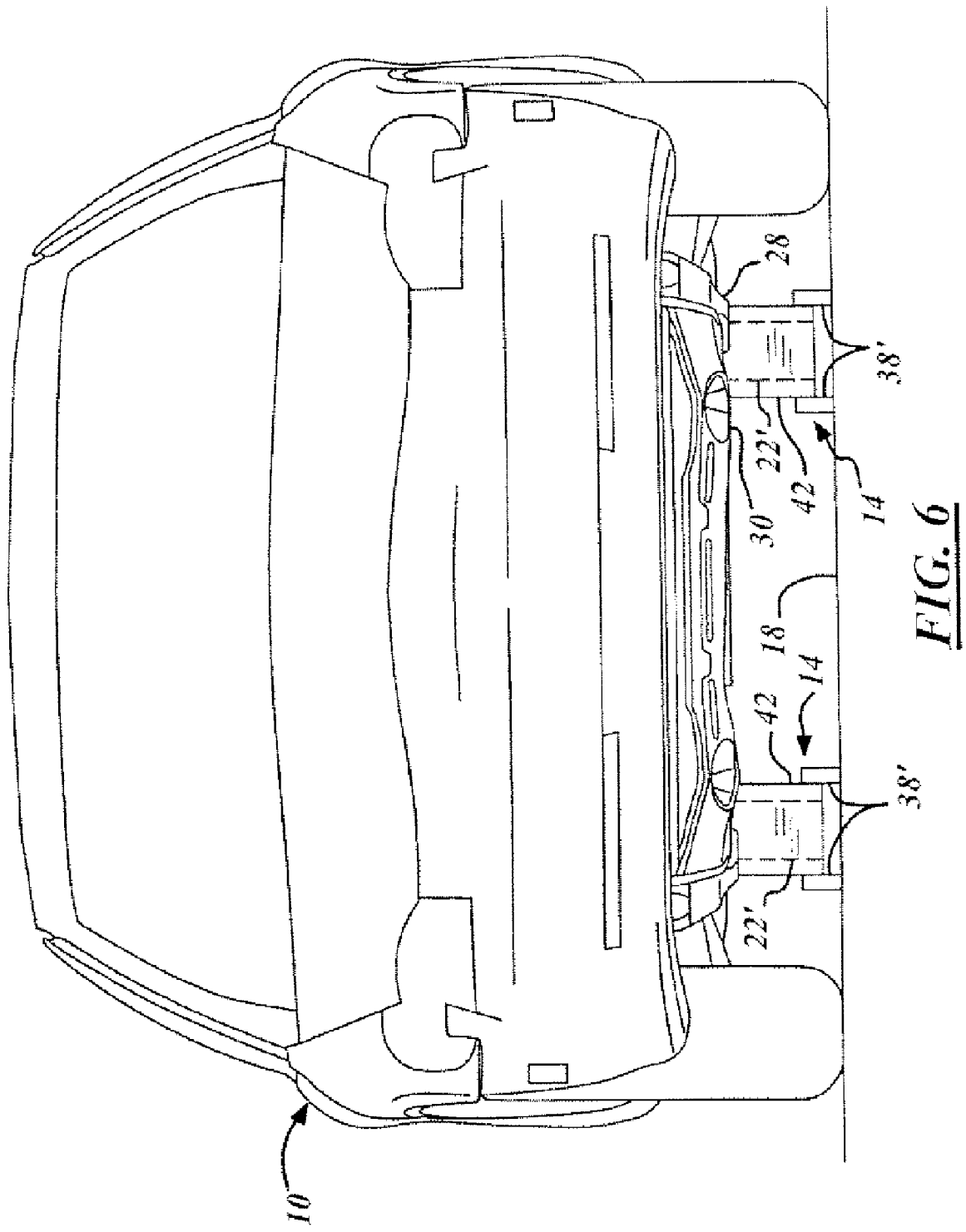
FIG. 6 is a front view of the car shown in FIGS. 5A and 5B, illustrating the underbody support system having two underbody crash devices.

Referring now to the embodiment shown in FIGS. 5A and 5B, each pillar member is comprised of a platform member 42, an expandable metal box 22' and a pair of wheels 38'. In particular, the platform member 42 is pivotally attached to the axle casing 30 by a suitable hinge fastener and has two wheels 38' extending therefrom. In the stored position, the box 22' is collapsed and sandwiched between the platform member 42 and the axle casing 30. During a collision, the inflator device 24 expands the box 22' and pivots the platform member 42 downward until the wheels 38' contact the road surface 18 and support the car 10 directly on the road surface 18.

While particular embodiments of the invention have been shown and described, it will be understood, of course, that the invention is not limited thereto since modifications may be made by those skilled in the art, particularly in light of the foregoing teachings. Accordingly, it is intended that the invention be limited only in terms of the appended claims.

What is claimed is:

1. An underbody crash device for a vehicle, comprising:
    a pillar member attached to said vehicle;
    said vehicle having a primary load path for absorbing crash energy in a collision;
    said pillar member movable to a deployed position for supporting said vehicle directly on the ground and positioning said vehicle to increase crash energy absorbed in said primary load path;
    said pillar member having a deformable construction for absorbing crash energy and providing a supplemental load path;
    said deformable construction being an expandable metal box folded.

2. The underbody crash device recited in claim 1 wherein said pillar member includes a platform attached to said expandable metal box for supporting said expandable metal box on the ground.

3. The underbody crash device recited in claim 1 wherein said pillar member has at least one wheel for rolling across the ground.

4. An underbody support system for a vehicle, comprising:
    a pillar member attached to said vehicle;
    said vehicle having a primary load path for absorbing crash energy in a collision;
    said pillar member movable to a deployed position for supporting said vehicle directly on the ground and positioning said vehicle to increase crash energy absorbed in said primary load path;
    said pillar member having a deformable construction for absorbing crash energy and providing a supplemental load path;
    said deformable construction being an expandable metal box folded; and
    an actuator moving said pillar member to said deployed position.

5. The underbody support system recited in claim 4 wherein said actuator is an inflator device.

6. The underbody support system recited in claim 4 further comprising:
    at least one sensor coupled to said actuator and detecting said collision.

7. A vehicle comprising:
    an underbody vehicle structure;
    a bumper adjacent to said underbody vehicle structure;
    at least one pillar member attached to said underbody vehicle structure and offset from said bumper;
    said at least one pillar member movable to a deployed position for supporting said vehicle directly on the ground and preventing said vehicle from diving toward the ground in a car-to-truck collision;
    said at least one pillar member having a deformable construction for absorbing crash energy and providing a supplemental load path;
    said deformable construction being an expandable metal box folded.

8. The vehicle recited in claim 7 further comprising:
    said pillar member movable to a deployed position for positioning said vehicle to increase crash energy absorbed within said primary load path;
    an actuator moving said pillar member to said deployed position;
    said actuator an inflator device; and at least one sensor coupled to said actuator and detecting said collision;
    said deformable construction absorbing crash energy and comprising a supplemental load path substantially perpendicular to said primary load path;
    said pillar member offset in at least one of a rearward direction from a front bumper and a forward direction from a rear bumper.

* * * * *